United States Patent
Nakanishi et al.

(10) Patent No.: US 9,798,174 B2
(45) Date of Patent: Oct. 24, 2017

(54) LIQUID CRYSTAL DISPLAY APPARATUS

(71) Applicant: Sharp Kabushiki Kaisha, Osaka-shi, Osaka (JP)

(72) Inventors: Youhei Nakanishi, Osaka (JP); Hisashi Watanabe, Osaka (JP); Masanobu Mizusaki, Osaka (JP); Takeshi Noma, Osaka (JP); Masayuki Kanehiro, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 111 days.

(21) Appl. No.: 14/907,366

(22) PCT Filed: Jul. 25, 2014

(86) PCT No.: PCT/JP2014/069691
§ 371 (c)(1),
(2) Date: Jan. 25, 2016

(87) PCT Pub. No.: WO2015/012388
PCT Pub. Date: Jan. 29, 2015

(65) Prior Publication Data
US 2016/0178957 A1    Jun. 23, 2016

(30) Foreign Application Priority Data
Jul. 26, 2013 (JP) .................................. 2013-155785

(51) Int. Cl.
G02F 1/1339 (2006.01)
G02F 1/1333 (2006.01)
G02F 1/1341 (2006.01)

(52) U.S. Cl.
CPC ...... *G02F 1/133308* (2013.01); *G02F 1/1339* (2013.01); *G02F 1/1341* (2013.01); *G02F 2001/133325* (2013.01)

(58) Field of Classification Search
CPC ............. G02F 1/133308; G02F 1/1339; G02F 1/1341; G02F 2001/133325
See application file for complete search history.

(56) References Cited

U.S. PATENT DOCUMENTS

5,835,179 A * 11/1998 Yamanaka ............ G02F 1/1335
349/161
7,830,595 B2 * 11/2010 Hinata .............. G02F 1/133308
359/245

(Continued)

FOREIGN PATENT DOCUMENTS

JP    06-123882 A    5/1994
JP    2006-267532 A   10/2006

(Continued)

OTHER PUBLICATIONS

Official Communication issued in International Patent Application No. PCT/JP2014/069691, dated Oct. 14, 2014.

*Primary Examiner* — Jia Pan
(74) *Attorney, Agent, or Firm* — Keating & Bennett, LLP

(57) ABSTRACT

A liquid crystal display device includes: a lateral casing portion in the shape of a lateral wall which has an inner lateral surface provided in an annular arrangement; a panel structure including at least a liquid crystal panel, the liquid crystal panel including a pair of substrates, a liquid crystal layer held between the pair of substrates, and a seal material, the panel structure being housed in a housing space defined by the inner lateral surface of the lateral casing portion; and a resin material filling at least part of a gap formed between the inner lateral surface of the lateral casing portion and a lateral end face of the liquid crystal panel, wherein the seal material of the liquid crystal panel is covered with the resin material and the lateral casing portion.

11 Claims, 13 Drawing Sheets

(56) References Cited

U.S. PATENT DOCUMENTS

| | | | |
|---|---|---|---|
| 2007/0053063 A1* | 3/2007 | Adachi | G02B 1/111 359/582 |
| 2009/0147205 A1 | 6/2009 | Mizuno et al. | |
| 2009/0185100 A1* | 7/2009 | Matsuhira | G02B 6/005 349/58 |
| 2009/0290113 A1* | 11/2009 | Nakahata | B32B 38/1866 349/138 |
| 2011/0285934 A1* | 11/2011 | Watanabe | G02F 1/133526 349/58 |
| 2012/0062825 A1* | 3/2012 | Seo | G02F 1/133308 349/122 |
| 2012/0138922 A1 | 6/2012 | Yamazaki et al. | |
| 2013/0027857 A1* | 1/2013 | Jeong | G02F 1/133308 361/679.01 |
| 2013/0308075 A1* | 11/2013 | Watanabe | G02F 1/133308 349/61 |
| 2013/0321293 A1* | 12/2013 | Park | G06F 3/041 345/173 |

FOREIGN PATENT DOCUMENTS

| | | |
|---|---|---|
| JP | 2006-299034 A | 11/2006 |
| JP | 2007-046035 A | 2/2007 |
| JP | 2009-103857 A | 5/2009 |
| JP | 2009-145403 A | 7/2009 |
| JP | 2010-037517 A | 2/2010 |
| JP | 2011-225773 A | 11/2011 |
| JP | 4933751 B2 | 5/2012 |
| JP | 2012-134475 A | 7/2012 |
| JP | 2012-151109 A | 8/2012 |
| WO | 2010/089998 A1 | 8/2010 |

* cited by examiner

FIG. 7
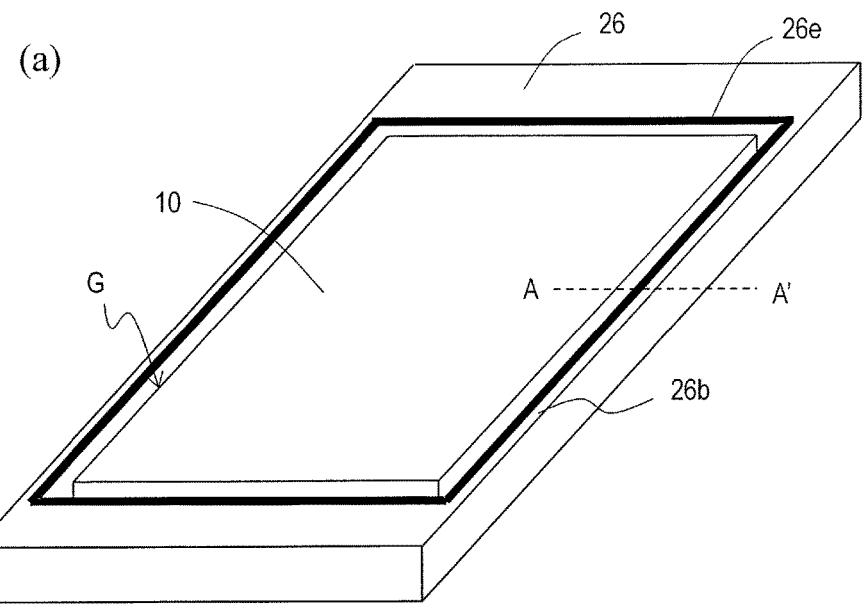
(a)
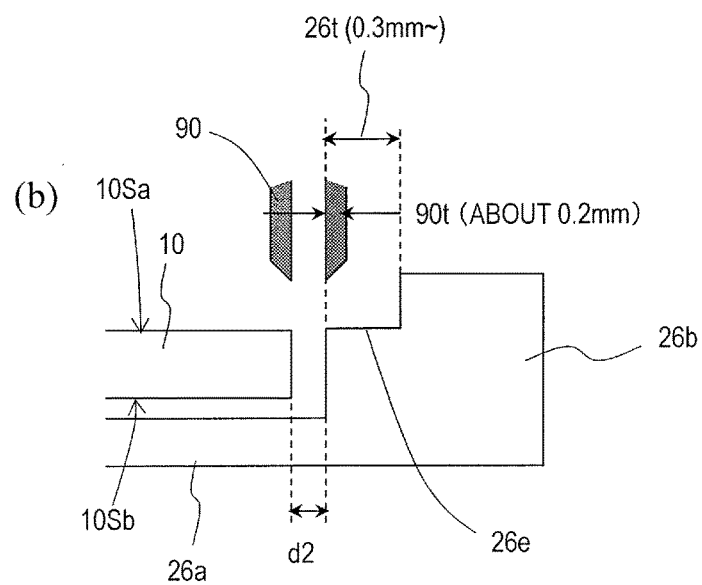
(b)

FIG.8
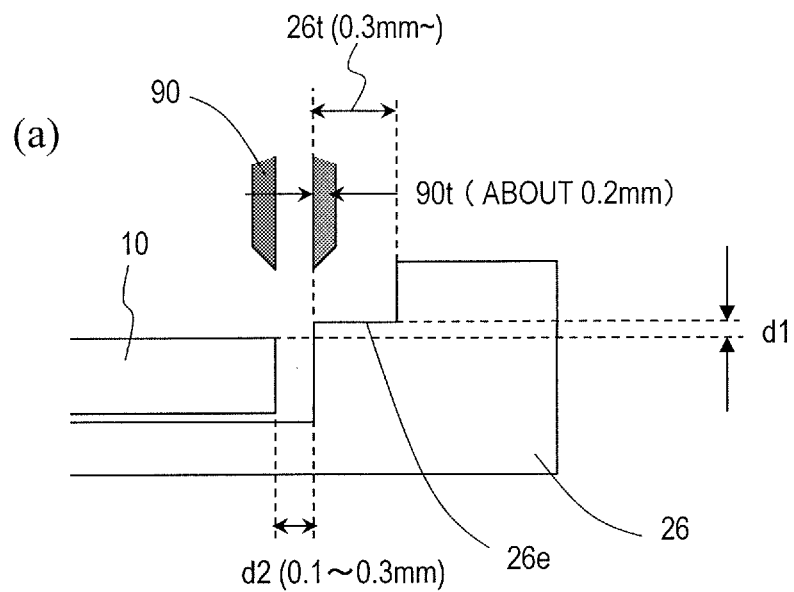
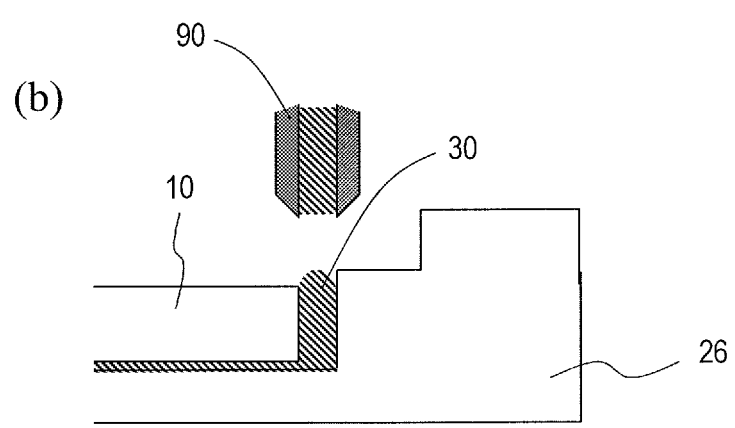

FIG.9
(a)
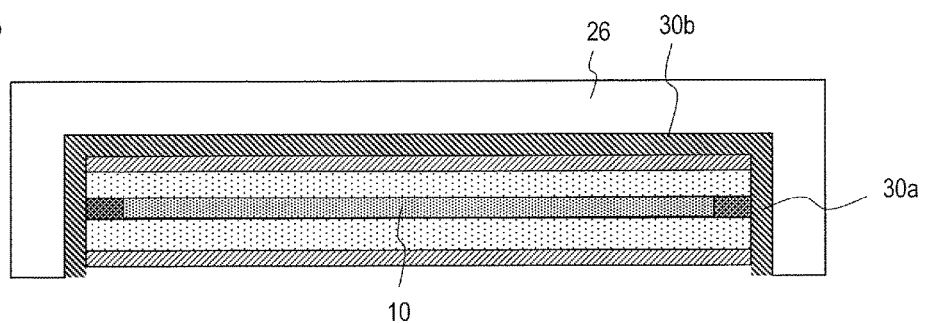
(b)
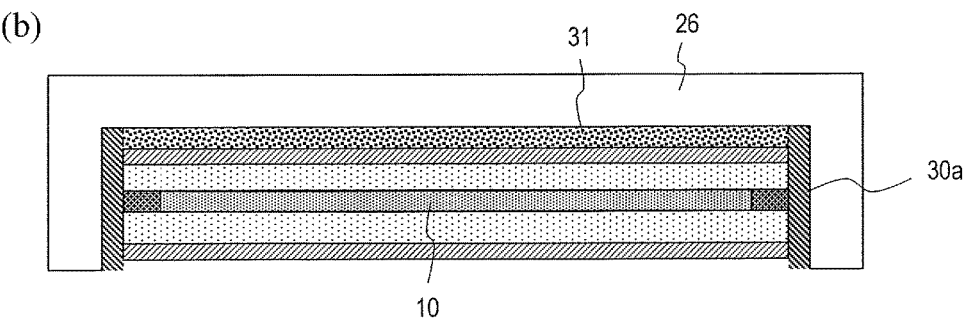

FIG.10
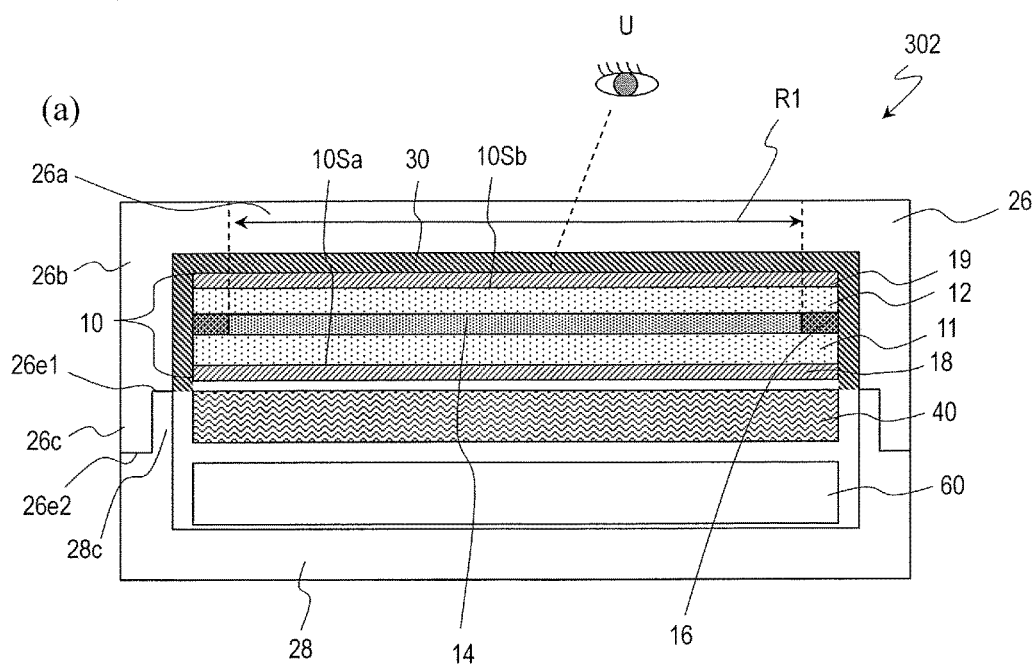
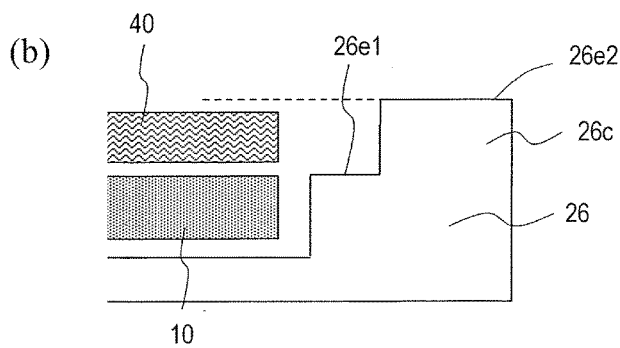

*FIG.11*
(a)
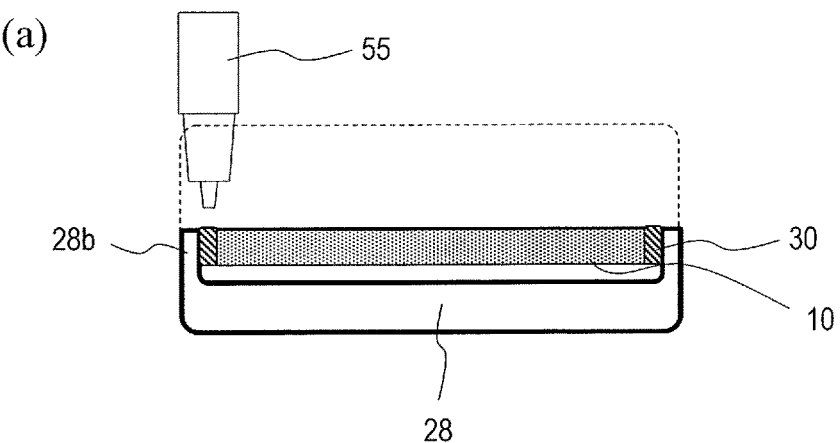
(b)
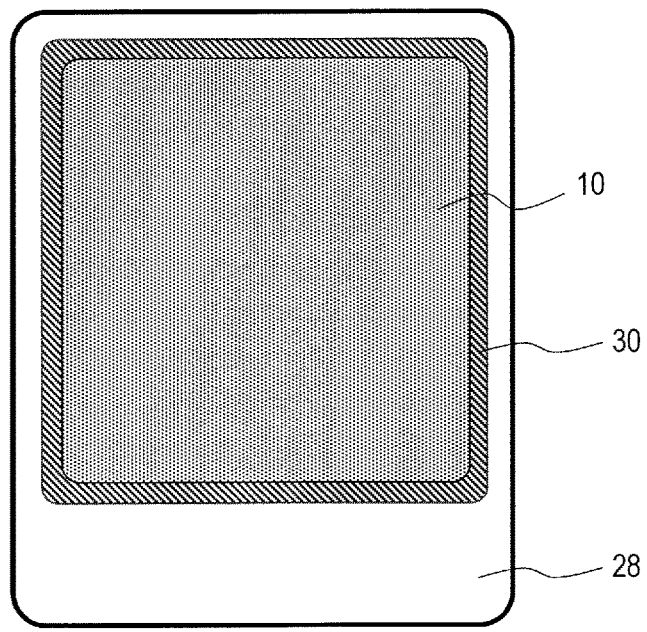

LIQUID CRYSTAL DISPLAY APPARATUS

TECHNICAL FIELD

The present invention relates to a liquid crystal display device.

BACKGROUND ART

Liquid crystal display devices which have higher performance have been developed as their uses expand. Particularly, the display modes, such as MVA (Multi-domain Vertical Alignment) mode, IPS (In-Plane-Switching) mode and FFS (Fringe Field Switching) mode which have wide viewing angle characteristics, have been developed, and the display quality of the liquid crystal display devices have considerably improved.

A liquid crystal display device includes a liquid crystal panel held in a casing. The liquid crystal panel usually includes a pair of substrates and a liquid crystal layer held between these substrates. In the liquid crystal panel, the liquid crystal layer is enclosed between the substrates by a seal material which is provided so as to surround the liquid crystal layer. The seal material used is, for example, a UV (ultraviolet ray) curable resin material.

Known examples of the method for providing the liquid crystal layer between the substrates include vacuum injection and ODF (One Drop Fill) methods.

In the vacuum injection method, firstly, a seal material is provided in an annular arrangement at the perimeter of one of the substrates. This substrate is combined with the other substrate, whereby a vacant cell is produced. Then, a liquid crystal material is injected into the vacant cell according to a vacuum differential pressure method. Lastly, an inlet is sealed off, whereby a liquid crystal panel is obtained.

In the ODF method, a seal material is provided in an annular arrangement at the perimeter of one of the substrates, and a liquid crystal material is dropped in a region surrounded by the seal material. Thereafter, the substrate to which the liquid crystal material has thus been provided is combined with the other substrate, whereby a liquid crystal panel is obtained.

CITATION LIST

Patent Literature

Patent Document 1: Japanese Laid-Open Patent Publication No. 2009-145403
Patent Document 2: Japanese Laid-Open Patent Publication No. 2006-267532
Patent Document 3: WO 2010-089998

SUMMARY OF INVENTION

Technical Problem

Meanwhile, an endeavor to reduce the frame region of the liquid crystal panel has been put forth year after year. The frame region is a region provided around the display region. The frame region does not include pixels and does not contribute to displaying.

Reducing the width of the frame region can realize a large display region in a display device. Accordingly, for example, size reduction and larger screen sizes can be achieved in mobile devices. In a multi-display system which is tiled with a plurality of liquid crystal panels, narrow-frame liquid crystal panels are used such that a seam between the panels (black frame) can be inconspicuous.

For realization of a narrow frame, reducing the width of the seal material as much as possible is also effective. However, excessively reducing the width of the seal material can disadvantageously cause a display failure in a peripheral display region.

FIG. 15 shows the display region R1 and the frame region R2 of a liquid crystal panel 900. In the display region R1, pixels are arranged. In the frame region R2, terminal regions for driving the pixels, etc., are provided. In the illustrated example, the terminal regions are only provided in parts of the frame region at the upper and left sides. In each of the terminal regions, a flexible printed circuit FPC is connected.

In the narrow-frame liquid crystal panel 900, a seal material R3 provided at the boundary between the display region R1 and the frame region R2 is designed so as to have a very narrow width. Further, the distance from the inner edges of the seal material R3 to the pixels is short. Therefore, water vapor and impurities are likely to pass through the seal material R3 and enter into the liquid crystal layer from the outer environment. Further, water vapor or the like which has entered into the liquid crystal layer is likely to cause adverse effects on displaying at the peripheral part of the display region R1 (hereinafter, also referred to as "peripheral display region R1$a$").

For the reasons described above, in the narrow-frame liquid crystal panel 900, display failures, such as stain and unevenness, are sometimes observed in the peripheral display region R1$a$.

Conventionally, the techniques of preventing display failures in the peripheral display region have been developed. Patent Document 1 discloses a configuration where a second seal material which is formed by an inorganic film is provided so as to cover the outer surface of a seal material that encloses the liquid crystal layer. Patent Document 1 also discloses that an alkylsiloxane compound is used as the material of the second seal material. Note that a display device described in Patent Document 1 is a projection type liquid crystal display device rather than a direct view type liquid crystal display device.

Patent Document 2 describes a configuration of two sealing layers which are made of epoxy resin materials. In this configuration, the outer sealing layer is made of a material which has lower moisture absorbency than the material of the inner sealing layer.

By providing such an additional protection layer that covers the outer surface of the seal material, entry of water vapor or the like into the liquid crystal layer can be suppressed. As a result, deterioration of the display quality can be prevented particularly in the peripheral display region.

However, in narrow-frame liquid crystal display devices produced in recent years, the seal material has still narrower widths. According to the knowledge of the present inventors, it was found that, in such liquid crystal display devices, occurrence of display failures cannot always be prevented even by conventional solutions. Thus, suppressing entry of water vapor and impurities into the liquid crystal layer while realizing a narrow frame has been demanded.

The present invention was conceived for the purpose of solving the above problems. An object of the present invention is to provide a liquid crystal display device in which deterioration of the display quality in a peripheral region can be suppressed even when the frame is narrow.

Solution to Problem

A liquid crystal display device according to an embodiment of the present invention includes: a casing including a lateral casing portion which has an inner lateral surface and a housing space surrounded by the inner lateral surface; a panel structure including a liquid crystal panel, the liquid crystal panel including a pair of substrates, a liquid crystal layer held between the pair of substrates, and a seal material arranged so as to enclose the liquid crystal layer, the panel structure being housed in the housing space; and a resin layer filling at least part of a gap formed between the inner lateral surface of the lateral casing portion and a lateral end face of the liquid crystal panel, the resin layer securing the liquid crystal panel to the inner surface, wherein in an in-plane direction of the liquid crystal panel, the seal material of the liquid crystal panel is covered with the resin layer and the lateral casing portion.

In one embodiment, the resin layer covers an entire lateral end face of the liquid crystal panel, the entire lateral end face of the liquid crystal panel including a lateral end face of the pair of substrates.

In one embodiment, the lateral casing portion has an end face continuing to the inner lateral surface, the end face being generally perpendicular to the inner lateral surface, the panel structure and the liquid crystal panel each has a first surface which is closer to the end face of the lateral casing portion and a second surface which is opposite to the first surface, and a level difference d1 in a direction normal to the liquid crystal panel between the end face of the lateral casing portion and the first surface of the panel structure or the liquid crystal panel is not less than 0 mm and not more than 0.1 mm.

In one embodiment, the level difference d1 is smaller than a width d2 of a gap between the inner lateral surface and the lateral end face of the liquid crystal panel.

In one embodiment, the width d2 of the gap is not less than 0.1 mm and not more than 0.3 mm.

In one embodiment, the resin layer is made of a cationically-polymerized resin material.

In one embodiment, the seal material is a material which is different from the resin layer.

In one embodiment, a width of the seal material is not more than 1.0 mm.

In one embodiment, the liquid crystal display device further includes a light-transmissive cover including a lens portion at a position corresponding to a perimeter portion of the panel structure, the light-transmissive cover being arranged so as to cover the panel structure.

In one embodiment, the panel structure has a planar rectangular shape which has four sides, the inner lateral surface of the lateral casing portion is arranged so as to surround the four sides, and the resin layer is provided only in portions corresponding to three, two, or one of the four sides.

In one embodiment, the casing includes a flat plate portion which is connected to the lateral casing portion and which forms a bottom surface of the housing space, and a resin layer which is made of the same material as the resin layer is also provided in a gap between the panel structure and the flat plate portion.

In one embodiment, the liquid crystal display device further includes another casing, the another casing including a lateral casing portion which has an inner lateral surface and a housing space surrounded by the inner lateral surface, wherein a backlight is held in the housing space of the another casing, the casing and the another casing are joined together such that end faces of their lateral casing portions are joined together, and the liquid crystal panel and the backlight are stacked up.

Advantageous Effects of Invention

In a liquid crystal display device according to an embodiment of the present invention, entry of water vapor and impurities into the liquid crystal layer can be suppressed, and deterioration of the display quality in a peripheral region can be suppressed, even when the frame region is narrow.

BRIEF DESCRIPTION OF DRAWINGS

FIG. 7 Diagrams for illustrating the process of manufacturing the liquid crystal display device of Embodiment 3. (a) is a perspective view. (b) is a cross-sectional view taken along line A-A' of (a).

FIG. 8 Diagrams for illustrating the process of manufacturing the liquid crystal display device of Embodiment 3. (a) is a cross-sectional view showing a state before injection of a resin. (b) is a cross-sectional view showing a state after the injection of the resin.

FIG. 9 Cross-sectional views for illustrating forms where a liquid crystal panel is secured to an upper casing. (a) and (b) show different forms.

FIG. 10 Cross-sectional views showing the configuration of a liquid crystal display device of a variation of Embodiment 3. (a) shows the entirety. (b) enlargedly shows the vicinity of a lateral end face of a liquid crystal panel.

FIG. 11 Diagrams for illustrating the method for securing a liquid crystal panel to a casing of a liquid crystal display device of Embodiment 4. (a) is a cross-sectional view. (b) is a plan view.

DESCRIPTION OF EMBODIMENTS

Figure 1:
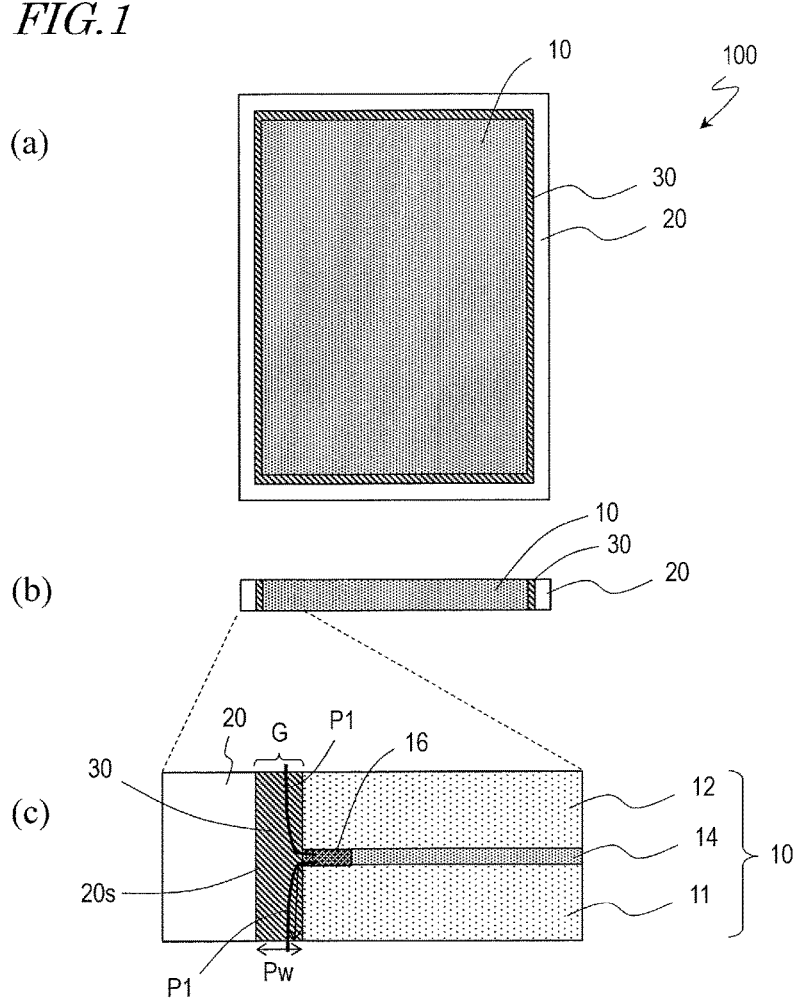
FIG. 1 (a) is a plan view of a liquid crystal display device according to Embodiment 1 of the present invention. (b) is a cross-sectional view of the liquid crystal display device. (c) is a partial cross-sectional view enlargedly showing an edge region of the cross-sectional view shown in (b).

Hereinafter, embodiments of the present invention are described with reference to the drawings, although the present invention is not limited thereto. The term "liquid crystal display device" used in this specification refers to various electronic devices having a liquid crystal panel. In this specification, the "liquid crystal display device" is not limited to a display device, such as a liquid crystal monitor, but may be any of various electronic devices including, for example, smartphones, tablet computers, and handheld game consoles, so long as it includes a liquid crystal panel.

Embodiment 1

FIGS. 1(a) to 1(c) show the configuration of a liquid crystal display device 100 according to Embodiment 1 of the present invention. The liquid crystal display device 100 includes a liquid crystal panel 10, a casing which includes a lateral casing portion 20 (lateral wall portion) surrounding the lateral end faces of the liquid crystal panel 10 with a gap G provided therebetween, and a resin layer 30 which is formed of a resin material that fills the gap G.

As shown in FIG. 1(c), the liquid crystal panel 10 includes a pair of substrates 11, 12 (e.g., a TFT substrate 11 and a counter substrate 12) which are made of glass or the like, and a liquid crystal layer 14 interposed between these substrates. Between the pair of substrates 11, 12, a seal material 16 is provided in an annular arrangement so as to surround the liquid crystal layer 14. The seal material 16 is provided for the purpose of enclosing the liquid crystal layer 14 between the substrates and for the purpose of securing the pair of substrates 11, 12 to each other.

The material of the seal material 16 can be, for example, an epoxy or acrylic curable resin material, and may be any of a thermosetting material, a UV-curable material, and a material which requires both UV-curable and thermosetting properties. The seal material 16 also serves to prevent the surrounding environment from affecting the liquid crystal material inside the liquid crystal panel and changing the electro-optic characteristics.

In the liquid crystal panel 10, lateral end faces are defined which are formed by the lateral end faces of the pair of substrates 11, 12 and the outer surface of the seal material 16. The inner lateral surfaces 20s of the lateral casing portion 20 are provided in an annular arrangement so as to surround these lateral end faces of the liquid crystal panel 10. In the liquid crystal display device 100, the liquid crystal panel 10 is housed in a space surrounded by the inner lateral surfaces 20s of the lateral casing portion 20 (housing space).

The resin layer 30 is a resin layer obtained by, for example, curing a UV (ultraviolet) curable resin material that fills the gap G between the lateral end faces of the liquid crystal panel 10 and the inner lateral surfaces 20s of the lateral casing portion 20. The resin layer 30 is arranged so as to cover the entire lateral end faces of the liquid crystal panel 10, i.e., so as to be in close contact with the end faces of the pair of substrates 11, 12 and the outer surface of the seal material 16 and thereby cover these surfaces. The material of the resin layer 30, which will be described later, can be, for example, a cationically-polymerized resin material.

In this configuration, as shown in FIG. 1(c), the entry route P1 for water vapor (or impurities) entering from the outside of the liquid crystal display device 100 into the liquid crystal layer 14 is limited to such a route that water vapor enters into the resin layer 30 from end faces of the resin layer 30 which are exposed at the top and the bottom and which have width Pw, and passes through the seal material 16 and reaches the inside of the liquid crystal layer 14. This is because the outer surface of the resin layer 30 is in close contact with the lateral casing portion 20 that is made of a material of low moisture permeability and is entirely covered by that lateral casing portion 20.

The lateral casing portion 20 is preferably made of a material of low moisture permeability, for example, a resin such as a polycarbonate or acrylic resin, a metal such as an aluminum alloy, a magnesium alloy, or stainless steel, or any other material such as glass or a carbon fiber composite material. The thickness of the lateral casing portion 20 is set to, for example, 0.1 mm to 1.2 mm, although it is desired to be as thin as possible for the sake of narrowing the frame.

Figure 2:
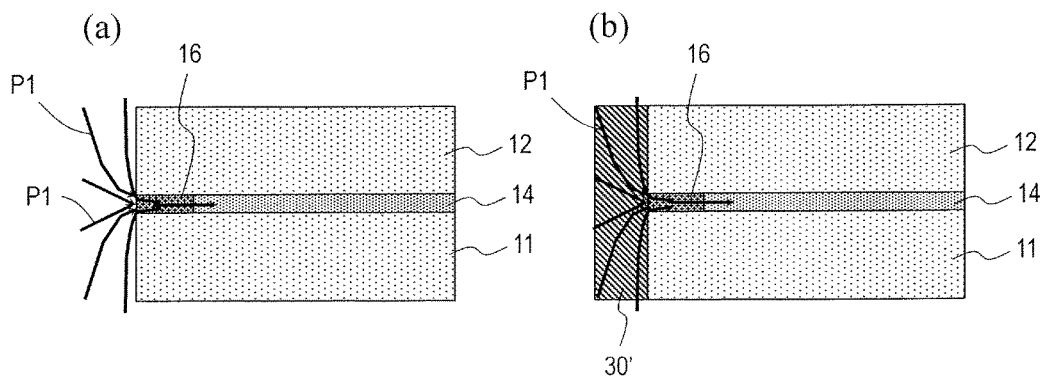
FIGS. 2 (a) and (b) are partial cross-sectional views showing the configurations of liquid crystal display devices of different comparative examples.

As a comparative example, a form where the outer surface of the seal material 16 is not covered with any other element is shown in FIG. 2(a). As another comparative example, a form where the outer surface of the seal material 16 is covered only with a resin layer 30' is shown in FIG. 2(b).

When the seal material 16 is not covered with a casing or resin layer as shown in FIG. 2(a), the entry route P1 for water vapor is not limited, so that water vapor can pass through the seal material 16 from various directions and enter the inside of the liquid crystal layer 14. In a narrow-frame liquid crystal panel such as shown in FIG. 2(b), only providing the resin layer 30' of low moisture permeability over the outer surface of the seal material 16 cannot sufficiently limit the entry route P1 for water vapor, so that sufficient moisture resistance cannot be achieved.

More specifically, in the configuration shown in FIG. 2(b), water vapor can enter from the entire exposed resin surfaces, and therefore, the inside of the resin reaches saturation in a shorter time. Thus, the length of time before water vapor enters into the liquid crystal panel cannot be substantially extended, so that water vapor can enter into the inside of the liquid crystal layer 14 relatively easily.

On the other hand, in the liquid crystal display device 100 of the present embodiment, exposed parts of the resin layer 30 are the top and bottom end faces as shown in FIG. 1, and therefore, the area of parts of the resin layer 30 which can be in direct contact with water vapor is very small. Accordingly, the amount per unit time of water vapor which approaches the end faces of the liquid crystal panel 10 can decrease. Further, in the resin layer 30, the entry route P1 for water vapor which can be formed between the environment and the liquid crystal panel 10 is narrow and long. Therefore, the same effect as that achieved by increasing the seal width of the liquid crystal panel 10 is achieved.

It is preferred that such a configuration is applied to a narrow-frame liquid crystal display device. In narrow-frame liquid crystal display devices produced in recent years, the width of the seal material 16 is set to, for example, 1.0 mm or less. Even when the resin layer 30 is provided, the thickness of the resin layer 30 is set to, for example, 0.8 mm or less. In such a case, the configuration such as described above in which the resin layer 30 and the lateral casing portion 20 are arranged so as to be in close contact with the outer surface of the seal material 16 is particularly effective in preventing entry of water vapor or impurities into the liquid crystal layer 14.

Note that, as will be described later, in the liquid crystal display device 100, the frame region does not need to be designed to have a large width. This is because there is a gap of about 0.1 mm to 0.3 mm between the casing and the liquid crystal panel 10, which is necessary for the assembly margin, and the resin can be injected into that gap. In such a way, the moisture proofness can be improved while a narrow frame is realized in the liquid crystal display device 100.

Figure 3:
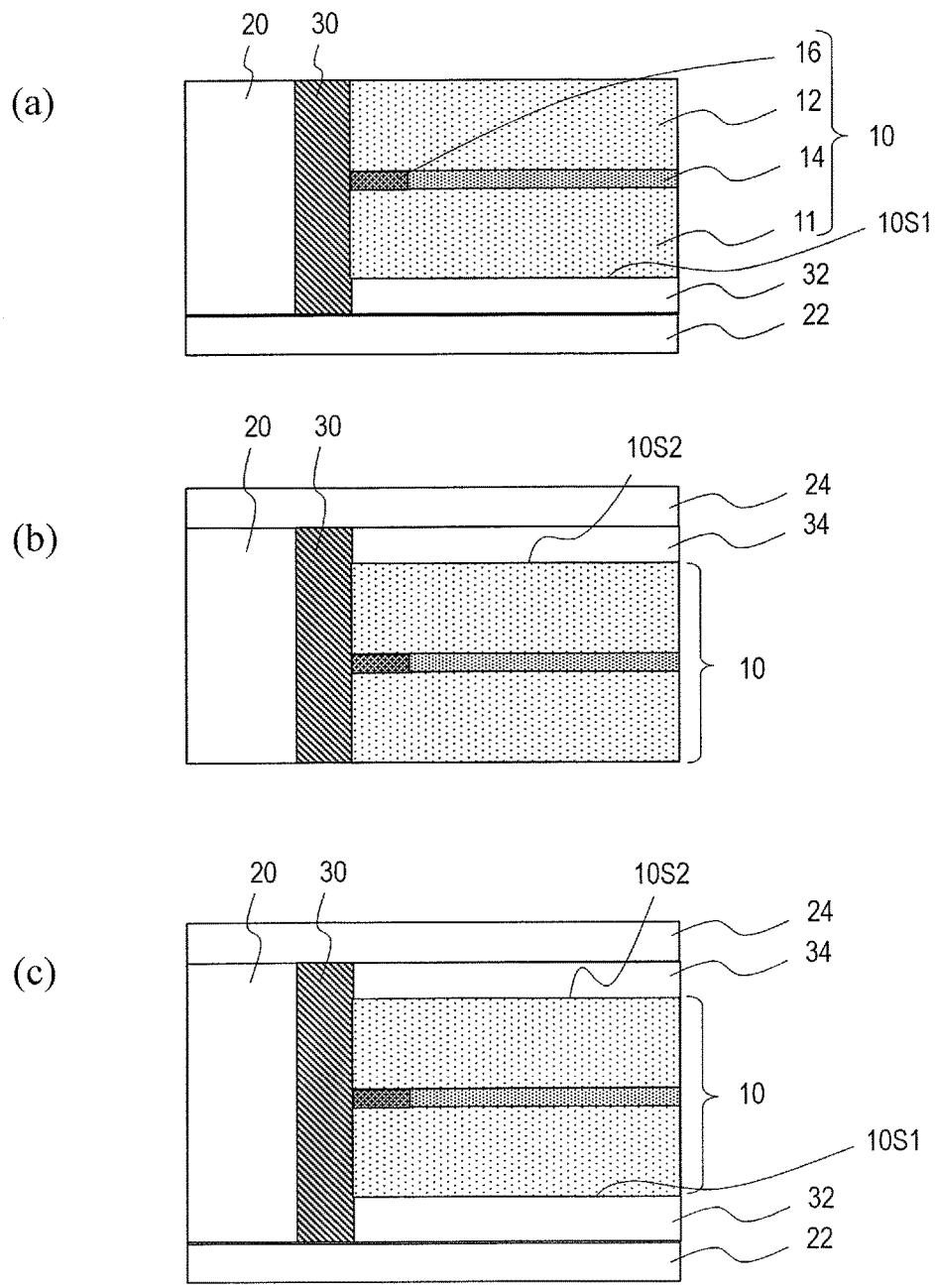
FIG. 3 (a) to (c) are partial cross-sectional views respectively showing the configurations of liquid crystal display devices of different variations.

Hereinafter, a variation of the liquid crystal display device 100 of the present embodiment is described. FIGS. 3(a) to 3(c) each shows a liquid crystal display device of a variation of the present embodiment, which corresponds to the portion shown in FIG. 1(c).

In the variation shown in FIG. 3(a), the lateral end faces of the liquid crystal panel 10, including the outer end faces of the seal material 16, are covered with the resin layer 30 and the lateral casing portion 20 that is provided on the outer side of the resin layer 30 in the same way as in the form shown in FIG. 1. Further, in this variation, a transparent casing (transparent cover) 22 is provided so as to cover the rear surface 10S1 of the liquid crystal panel 10. The transparent casing 22 further covers the end faces of the lateral casing portion 20 and the resin layer 30. The liquid crystal panel 10 and the transparent casing 22 are secured to each other by an intervening transparent resin layer 32.

The variation shown in FIG. 3(b) is different from the variation shown in FIG. 3(a) in that a transparent casing is provided on the front surface 10S2 of the liquid crystal panel 10. The transparent casing 24 also covers the end faces of the lateral casing portion 20 and the resin layer 30. The liquid crystal panel 10 and the transparent casing 24 are secured to each other by an intervening transparent resin layer 34.

The variation shown in FIG. 3(c) is different from the variation shown in FIG. 3(a) in that transparent casings 22, 24 are respectively provided on both the rear surface 10S1 side and the front surface 10S2 side of the liquid crystal panel 10. The transparent casings 22, 24 also cover the end faces of the lateral casing portion 20 and the resin layer 30. The liquid crystal panel 10 and the transparent casings 22, 24 are secured together by transparent resin layers 32, 34.

In each of the configurations shown in FIGS. 3(a) to 3(c), at least one of the end faces of the resin layer 30 is covered with the transparent casings 22, 24. Employing such a configuration enables to further limit the entry route for water vapor into the liquid crystal panel. Therefore, deterioration in display quality in the peripheral display region of the liquid crystal panel 10 can be further suppressed.

Next, the resin material for formation of the resin layer 30 is described.

The resin layer 30 is desirably made of a material of lower moisture permeability than the seal material 16 in order to improve the moisture proofness. To realize low moisture permeability, using a polymer material of high polymerization degree which is produced by ionic polymerization, particularly by cationic polymerization, is desirable. Specifically, a polymer material which includes an epoxy component (glycidyl group) as a major constituent, and in which the content of the epoxy component is at least not less than 50 wt %, desirably not less than 65 wt %, is used. The resin layer 30 may be made of a transparent resin so long as it is a material of low moisture permeability.

Note that using the above-described cationically-polymerized resin material of low moisture permeability as the seal material 16 of the liquid crystal panel 10 is not preferred in some cases. When the cation used for polymerization enters the liquid crystal, it considerably deteriorates the retention rate, so that the transmittance decreases, and accordingly, there is a probability that it causes display failures, such as black stains. Thus, the material of the seal material 16 and the material of the resin layer 30 may be different materials.

Table 1 presented below provides the results of a stain occurrence test which was performed on the liquid crystal display devices shown in FIG. 1(c) and FIGS. 3(a) to 3(c). In the stain occurrence test, these liquid crystal display devices were subjected to an aging test where the liquid crystal display devices were stored in a high-temperature high-humidity tank, which was kept at the temperature of 60° C. and the humidity of 90° C. Presence/absence of occurrence of stains was checked by eyes. Note that Table 1 also provides the results of an experiment on a panel with no humidity-proof feature which is shown in FIG. 2(a) as a comparative example (hereinafter, referred to as "reference panel").

TABLE 1

| | | Temperature: 60° C., Humidity: 90% (aging conditions) | | | |
|---|---|---|---|---|---|
| | Resin Layer | before aging | 400 hrs. | 800 hrs. | 1000 hrs. |
| Reference | none | stains not occurred | stains occurred | — | — |
| FIG. 1(c) | epoxy | stains not occurred | stains not occurred | stains occurred | — |
| FIG. 3(a) | epoxy | stains not occurred | stains not occurred | stains not occurred | stains not occurred |
| FIG. 3(b) | epoxy | stains not occurred | stains not occurred | stains not occurred | stains not occurred |
| FIG. 3(c) | epoxy | stains not occurred | stains not occurred | stains not occurred | stains not occurred |

As seen from Table 1, in the reference panel, black stains occurred near the corners of the display region after the passage of 400 hours, and thereafter, the area of black stains spread.

In a system where a cationically-polymerized epoxy resin was used in the form shown in FIG. 1(c), occurrence of stains was not found at a point in time where 400 hours had passed. Note that, after the passage of 800 hours, black stains were found in the display region.

In the liquid crystal display devices shown in FIGS. 3(a) to 3(c), in a system where a cationically-polymerized epoxy resin was used, no display failure occurred before the passage of 1000 hours.

It can be seen from the experimental results presented above that the configuration where the outer surface of the seal material is covered with the resin layer and the casing enables to effectively suppress occurrence of stains. It can also be seen that, as the material that forms the resin layer, a cationically-polymerized epoxy resin can be preferably used.

As a photo cationic polymerization initiator, for example, a boronate salt in which a boronic acid is the counter anion, an onium salt, a sulfonium borate salt, or the like, can be used.

As the epoxy resin, a resin which has an aliphatic cyclic skeleton and/or a resin which has an aromatic skeleton are preferably used. Examples of the aromatic skeleton include a bisphenol skeleton, a biphenyl skeleton, a naphthalene skeleton, and an anthracene skeleton.

Examples of the photo cationic polymerization initiator and the epoxy resin are disclosed in Japanese Laid-Open Patent Publication No. 2007-46035, Japanese Laid-Open Patent Publication No. 2012-151109, Japanese Laid-Open Patent Publication No. 2011-225773, Japanese Patent No. 4933751, and Japanese Laid-Open Patent Publication No. 2006-299034.

Embodiment 2

Hereinafter, as the liquid crystal display device of Embodiment 2, various configurations for a liquid crystal display device which includes a backlight 40 for supplying light into the liquid crystal panel 10 are described. In the present embodiment, the liquid crystal panel 10 is a transmissive liquid crystal panel. The liquid crystal panel 10 and the backlight 40 are typically secured to each other to constitute a multilayer structure (panel structure).

Liquid crystal display devices 200a to 200d shown in FIGS. 4(a) to 4(d) have forms where the liquid crystal panel 10 and the backlight 40 are housed in a housing space which is formed by an upper casing 26 and a lower casing 28.

The liquid crystal display device 200a shown in FIG. 4(a) includes the upper casing 26 which includes a flat plate portion 26a in the form of a thin plate and a lateral casing portion 26b in the form of a wall extending in a generally vertical direction from the perimeter of the flat plate portion 26a and the lower casing 28 which includes a flat plate portion 28a and a lateral casing portion 28b in the form of a wall extending in a generally vertical direction from the perimeter of the flat plate portion 28a.

In the upper casing 26, a recessed space (housing space) is defined which is surrounded by the inner lateral surface of the lateral casing portion 26b and the inner surface of the flat plate portion 26a. In the lower casing 28, a recessed space (housing space) is defined which is surrounded by the inner lateral surface of the lateral casing portion 28b and the inner surface of the flat plate portion 28a. The upper casing 26 and the lower casing 28 are joined together at the end faces 26e, 28e of their lateral casing portions 26b, 28b. In the present embodiment, their housing spaces are continuous. In this configuration, a single housing space is formed inside the joined upper and lower casings 26, 28.

The housing space of the upper casing 26 houses the liquid crystal panel 10. The upper casing 26 is made of a light-transmissive material and is configured such that a user can observe light outgoing from the display surface 10Sb of the liquid crystal panel 10. Meanwhile, the housing space of the lower casing 26 houses the backlight 40 such that the backlight 40 can emit light toward the liquid crystal panel 10.

In this configuration, the lateral casing portion 26b of the upper casing 26 surrounds the lateral end faces of the liquid crystal panel 10 with a very small gap therebetween. The flat plate portion 26a covers the surface of the liquid crystal panel 10 with a very small gap therebetween.

In the liquid crystal display device 200a, the gap between the upper casing 26 and the liquid crystal panel 10 is filled with a transparent resin layer 30. The liquid crystal panel 10 is housed in and secured to the housing space of the upper casing portion 26 by the intervening resin layer 30. Since the lateral end faces of the liquid crystal panel 10 are thus covered with the resin layer 30 and the lateral casing portion 26b, entry of water vapor into the liquid crystal layer is suitably prevented.

The liquid crystal panel 10 and the backlight 40 are bound together using a double-sided tape 39. The backlight 40 is attached to the rear surface of the liquid crystal panel 10 after the liquid crystal panel 10 has been secured in the housing space of the upper casing 26 using the resin layer 30. After the backlight 40 has been secured to the liquid crystal panel 10, the lower casing 28 is secured to the upper casing 26 such that the backlight 40 is protected in the housing space.

Here, one of the two surfaces of the liquid crystal panel 10 on the backlight 40 side, the surface 10Sa, (i.e., the surface which is closer to the end face 26e of the lateral casing portion 26b) is present at generally the same level (horizontal position) as the end face 26e of the lateral casing portion 26b. This is because, if the rear surface of the liquid crystal panel 10 and the end face 26e of the lateral casing portion are coplanar, appropriate injection of a resin into the gap formed between the liquid crystal panel 10 and the upper casing 26 is readily carried out, as will be described in detail later in the section of Embodiment 3.

Next, the configuration of a liquid crystal display device 200b shown in FIG. 4(b) is described. In the liquid crystal display device 200b, the liquid crystal panel 10 and the backlight 40 are stacked up so as to constitute a panel structure 5. In this configuration, the panel structure 5 is secured in the housing space of the upper casing 26 via the resin layer 30.

If the resin enters into the gap between the backlight 40 and the liquid crystal panel 10 of the panel structure 5, an optical sheet and other components of the backlight 40 are contaminated so that the optical characteristics can change, leading to failures. In view of such, it is preferred that the backlight 40 and the liquid crystal panel 10 are bound together using a double-sided tape, or the like, so as to be in tight contact with each other before they are housed in and secured to the upper casing 26.

Also in the liquid crystal display device 200b, the lateral end faces of the liquid crystal panel 10 are covered with the resin layer 30 and the lateral casing portion 26b. Therefore, entry of water vapor into the liquid crystal layer is suitably prevented.

Since a surface of the panel structure 5 which is closer to the end face 26e of the lateral casing portion (here, the rear surface of the backlight 40) and the end face 26e of the lateral casing portion are present at the same level, the resin layer 30 can be appropriately provided in the gap in housing and securing the panel structure 5 in the housing space of the upper casing 26.

Next, the configuration of a liquid crystal display device 200c shown in FIG. 4(c) is described. The liquid crystal display device 200c has a configuration where a touch panel 50 and a cover glass 52 are provided on a user side surface of the liquid crystal display device 200a shown in FIG. 4(a). In the liquid crystal display device 200c, the touch panel 50 and the cover glass 52 are attached to the outer surface of the upper casing 26 using a double-sided tape or a resin.

In this configuration, the liquid crystal panel 10 is secured in the housing space of the upper casing 26 via the resin layer 30. Entry of water vapor into the liquid crystal layer is prevented by the resin layer 30 and the upper casing 26.

Next, the configuration of a liquid crystal display device 200d shown in FIG. 4(d) is described. In the liquid crystal display device 200d, the touch panel 50 and the liquid crystal panel 10 are stacked up so as to constitute a panel structure 5. In this configuration, the panel structure 5 is secured in the housing space of the upper casing 26 via the resin layer 30. The rear surface side of the panel structure 5 is provided with the backlight 40, and these components are bound together using a double-sided tape 39.

Note that the panel structure 5 is a panel-like structure (e.g., panel multilayer structure) which includes at least the liquid crystal panel 10 and which is housed in the housing space of the upper casing 26. The backlight 40 is provided on the rear surface of the liquid crystal panel 10 as described above. This backlight 40 is not included in the panel structure 5 because the backlight 40 is to be provided in the housing space of the lower casing 28.

Also in the liquid crystal display device 200d, the lateral end faces of the liquid crystal panel 10 are covered with the resin layer 30 and the lateral casing portion 26b of the casing 26. Therefore, entry of water vapor into the liquid crystal layer is suitably prevented.

Since a surface of the panel structure 5 which is closer to the end face 26e of the lateral casing portion (here, the rear surface of the liquid crystal panel 10) and the end face 26*e* of the lateral casing portion are present at the same level, the resin layer 30 can be provided appropriately.

Figure 4:
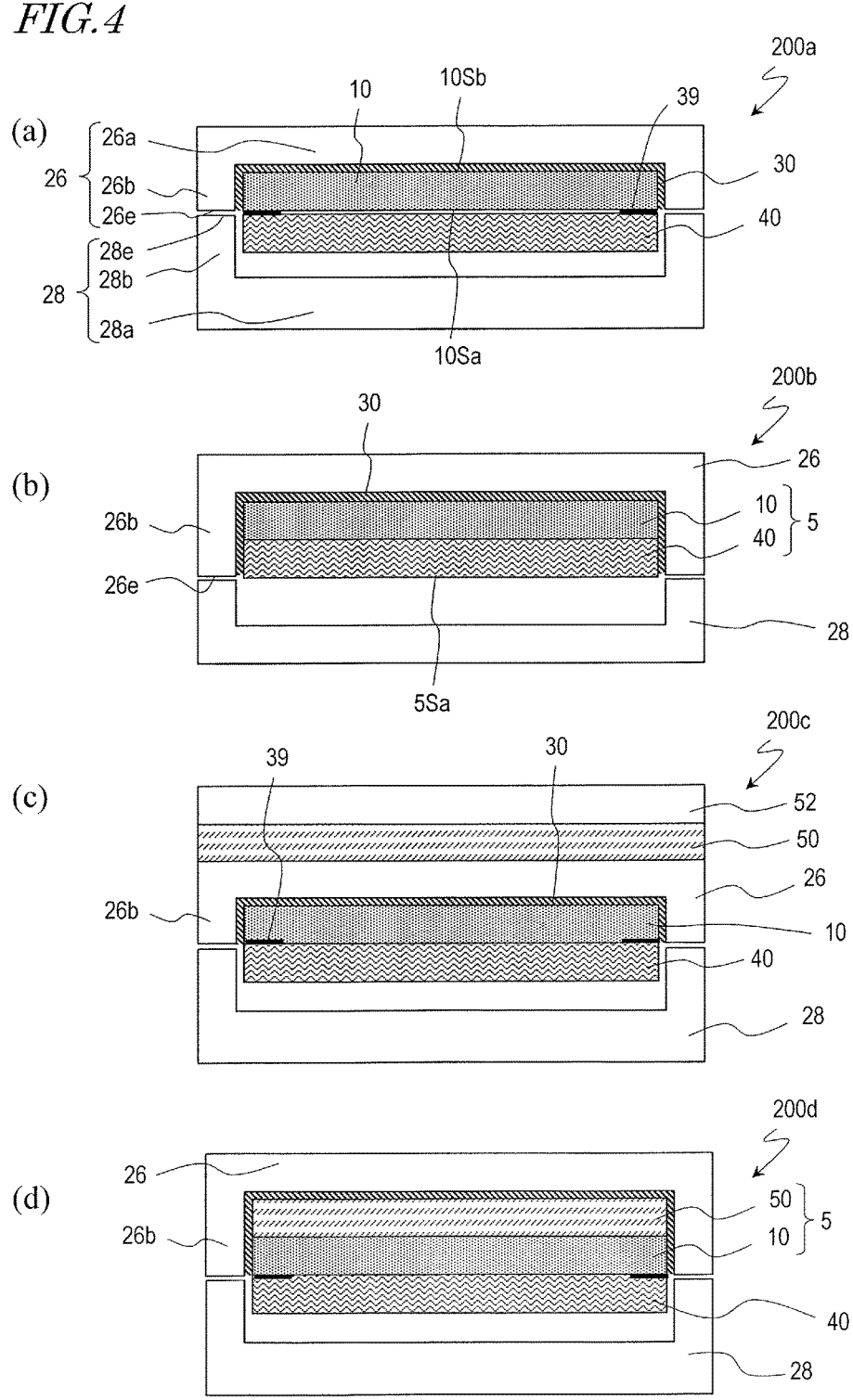
FIG. 4 Cross-sectional views showing the configuration of a liquid crystal display device of Embodiment 2. (a) to (d) respectively show different forms.

In this configuration, the liquid crystal panel 10 and the touch panel 50 are enclosed by a resin in the upper casing 26, so that the cover glass 52 shown in FIG. 4(*c*) is unnecessary, and reduction in thickness is possible.

Hereinafter, still another form is described with reference to FIGS. 5(*a*) to 5(*c*).

Figure 5:
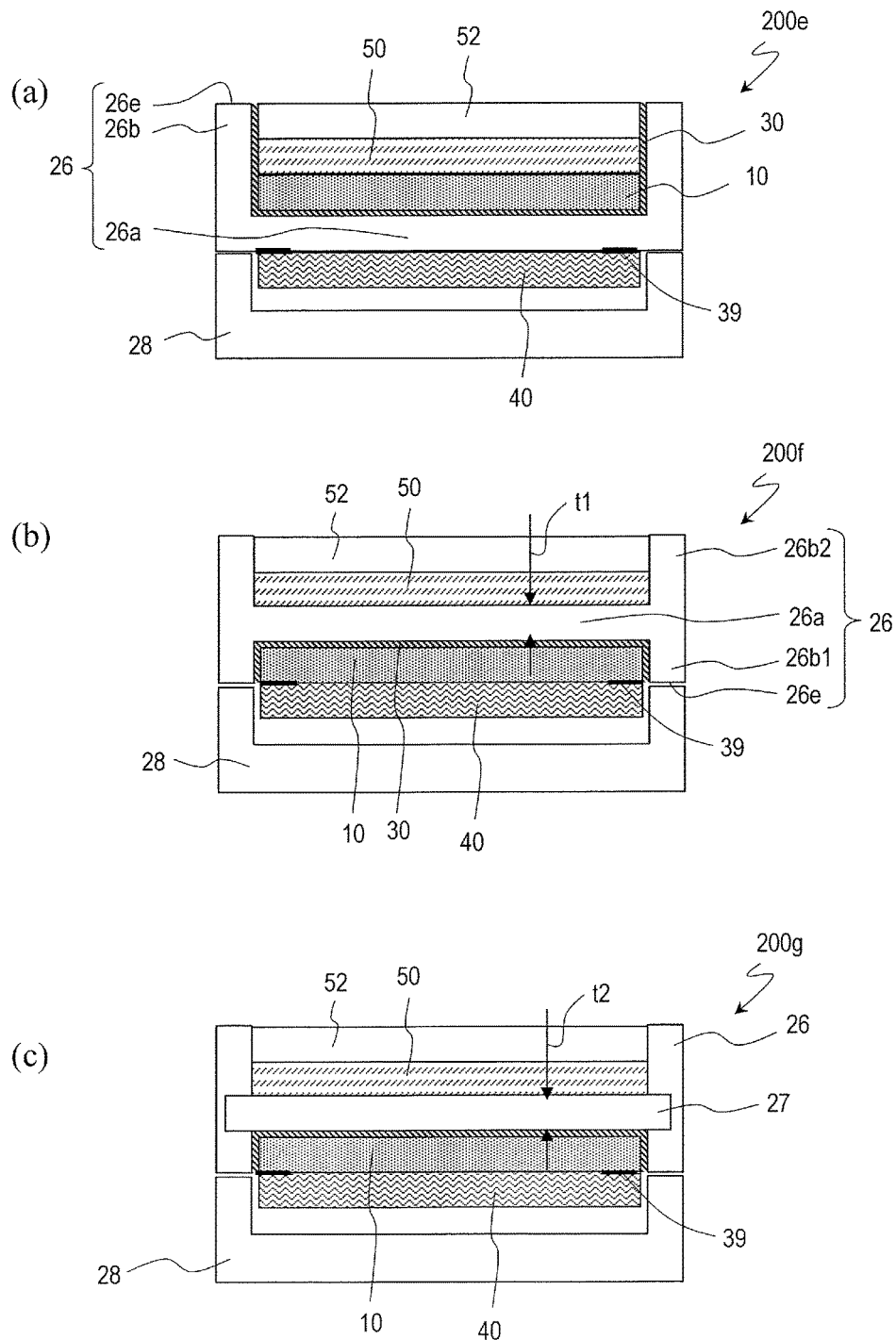
FIG. 5 Cross-sectional views showing the configuration of a liquid crystal display device of Embodiment 2. (a) to (c) respectively show different forms.

In a liquid crystal display device 200*e* shown in FIG. 5(*a*), the upper casing portion 26 is configured such that the end face 26*e* of the lateral casing portion 26*b* extending in a vertical direction from the flat plate portion 26*a* (here, bottom casing portion 26*a*) is open toward the outside of the liquid crystal display device 200*e*. The flat plate portion 26*a* of the upper casing portion 26 is provided in the inner part of the liquid crystal display device 200*e*.

In this configuration, a panel structure which is formed by a multilayer structure consisting of the cover glass 52, the touch panel 50, and the liquid crystal panel 10 is housed in the housing space of the upper casing 26. The lower casing 28 is secured to the rear surface of the flat plate portion 26*a* of the upper casing 26, with the backlight being housed in the lower casing 28. Note that the backlight 40 may be attached to the rear surface of the flat plate portion 26*a* of the upper casing 26 using a double-sided tape 39.

The rear surface of the liquid crystal panel 10 is secured to the flat plate portion 26*a* by the resin layer 30. The lateral end faces of the liquid crystal panel 10 are secured to the lateral casing portion 26*b* by the resin layer 30. The touch panel 50 and the cover glass 52 are attached to the surface (viewer side surface) of the liquid crystal panel 10 using a double-sided tape or a resin.

When the liquid crystal display device 200*e* is viewed from an oblique direction, the lateral casing portion 26*b* can be observed in some cases, and there is a probability that the visual quality deteriorates. However, on the other hand, the lateral surfaces of the cover glass 52 and the touch panel 50 are protected by the lateral casing portion 26*b*, and therefore, the mechanical strength can be improved.

In a liquid crystal display device 200*f* shown in FIG. 5(*b*), the upper casing 26 has such a configuration that the flat plate portion 26*a* is provided between a lower lateral casing portion 26*b*1 and an upper lateral casing portion 26*b*2. The liquid crystal display device 200*f* corresponds to a configuration where the upper lateral casing portion 26*b*2 for protecting the lateral end faces of the cover glass 52 and the touch panel 50 is provided in the upper casing 26 of the liquid crystal display device 200*c* shown in FIG. 4(*c*).

The liquid crystal panel 10 is secured in the housing space of the upper casing 26 via the resin layer 30 in the same way as in the liquid crystal display device 200*c* shown in FIG. 4(*c*). The backlight 40 is attached to the liquid crystal panel 10 using a double-sided tape 39, or the like, and is housed in the lower casing 28.

In this configuration, the lateral end faces of the cover glass 52 and the touch panel 50 are protected by the upper lateral casing portion 26*b*2, and therefore, breakage of these components can be prevented. Unlike the liquid crystal display device 200*e* shown in FIG. 5(*a*), deterioration of the visual quality would not occur in this configuration even when the display device is viewed from an oblique direction.

In a liquid crystal display device 200*g* shown in FIG. 5(*c*), the flat plate portion 26*a* of the upper casing 26 in the liquid crystal display device 200*f* shown in FIG. 5(*b*) is replaced by a different element, a transparent flat plate 27. The transparent flat plate 27 is joined to the inner lateral surface of the lateral casing portion 26, at a middle portion in the thickness direction of the lateral casing portion 26.

The thus-configured upper casing 26 can be formed by, for example, double molding for integrating different materials, such as resins and glass. The transparent flat plate 27 can be, for example, a thin glass or resin plate, which enables reduction in thickness of the entire device. Note that, in the liquid crystal display device 200*f* shown in FIG. 5(*b*), the upper casing 26 is typically formed by injection molding. In this case, the thickness of the flat plate portion 26*a*, t1, is often set to about 0.5 mm at the minimum. On the other hand, in the liquid crystal display device 200*g*, a thin transparent flat plate 27 which is made of glass, or the like, can be used. The thickness of the transparent flat plate 27, t2, can be set to about 0.1 mm, for example.

Embodiment 3

In Embodiment 3, the housing form in housing the liquid crystal panel 10 or a panel structure including the liquid crystal panel 10 in the recessed space of the upper casing 26 or the lower casing 28 via the resin layer 30 is described.

Figure 6:
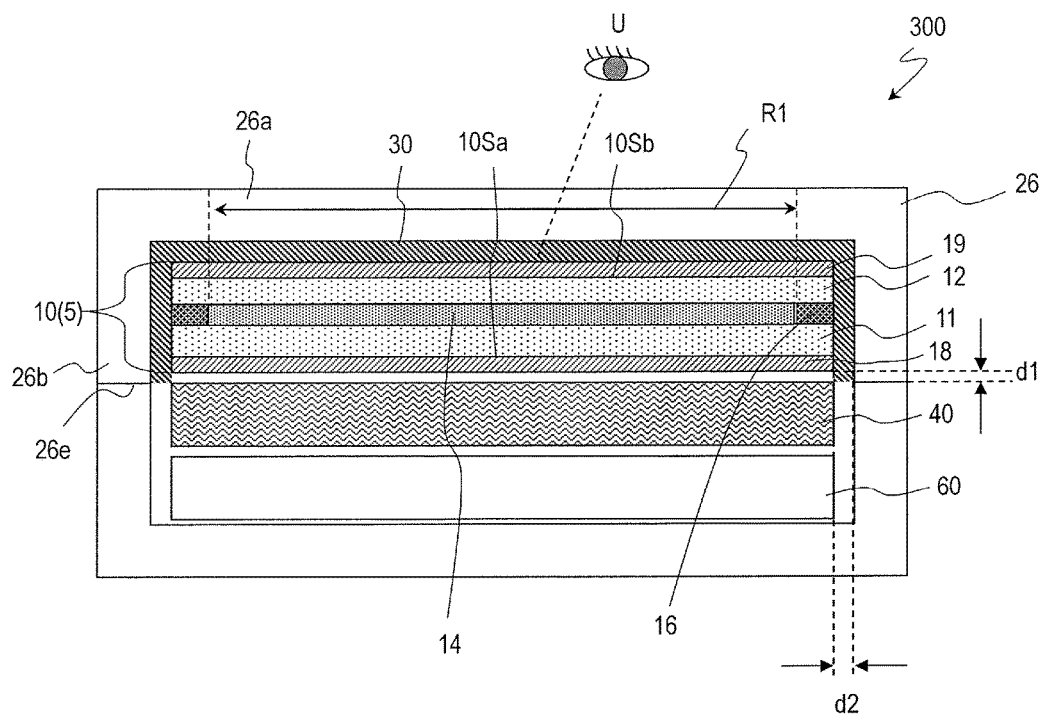
FIG. 6 A cross-sectional view showing the configuration of a liquid crystal display device of Embodiment 3.

FIG. 6 shows a cross section of a liquid crystal display device 300 which has a similar configuration to that of the liquid crystal display device 200*a* shown in FIG. 4(*a*). Note that elements which are equivalent to those of the liquid crystal display device 200*a* are designated by the same reference numerals, and descriptions thereof are herein omitted.

The liquid crystal display device 300 has a liquid crystal panel 10 which is provided in the housing space of an upper casing 26 and a backlight 40 and a circuit board 60 which are provided in the housing space of a lower casing 28. The circuit board 60 may include various signal processing circuits, driving circuits, power supplies, etc. Typically, the circuit board 60 is electrically coupled to the liquid crystal panel 10 and the backlight 40.

The liquid crystal panel 10 is housed in and secured to the housing space of the upper casing 26 via the resin layer 30. Note that, as will be described later, the resin layer 30 only needs to be provided at least in the gap between the lateral end faces of the liquid crystal panel 10 and the lateral casing portion 26*b*, and does not necessarily need to be provided so as to cover the display surface 10Sb of the liquid crystal panel 10.

Here, part of the upper casing 26 corresponding to at least the display region R1 of the liquid crystal panel 10 (generally the entirety of the flat plate portion 26*a*) has light-transmissivity and is typically transparent. In the display region R1, the resin layer 30 that is provided between the display surface 10Sb of the liquid crystal panel 10 and the upper casing 26 also has light-transmissivity and is typically transparent. This configuration enables a user U to view the display surface 10Sb of the liquid crystal panel 10.

In the present embodiment, the liquid crystal panel 10 includes a TFT substrate 11 and a counter substrate 12. Between these substrates, there is a liquid crystal layer 14 enclosed by a seal material 16. Here, a region surrounded by the boundary (the inner edge of the seal material 16) between the seal material 16 and the liquid crystal layer 14 is defined as "display region R1".

Typically, the TFT substrate 11 includes a plurality of TFTs and a plurality of pixel electrodes coupled to the TFTs. The counter substrate 12 includes color filters and a black matrix. The liquid crystal panel 10 may be in any of various display modes. For example, in the case of a MVA mode, the counter substrate 12 has a counter electrode and ribs or slits for regulating the orientation of liquid crystal molecules. Alternatively, for example, in the case of a FFS mode, the TFT substrate 11 has a common electrode which is arranged so as to oppose pixel electrodes via an insulating layer. The configuration of the liquid crystal panel 10 may be a known configuration.

A surface 10Sa of the liquid crystal panel 10 which is on the backlight side (rear surface) and the other surface 10Sb of the liquid crystal panel 10 which is on the user side (display surface) are provided with optical film layers 18, 19, respectively. The optical film layers 18, 19 are, for example, a pair of polarizer films which are in such a crossed Nicols arrangement that their transmission axes are perpendicular to each other. However, the optical film layers 18, 19 are not limited to this example but may be diffuser films or retarder films. Alternatively, the optical film layers 18, 19 may be a multilayer structure consisting of a plurality of stacked optical films which have the aforementioned functions.

Hereinafter, the process of securing the liquid crystal panel 10 in the housing space of the upper casing 26 using a resin is described.

As shown in FIGS. 7(a) and 7(b), the liquid crystal panel 10 is provided in the recessed space of the upper casing 26 with a very small gap G. Here, the liquid crystal panel 10 is arranged such that the display surface 10Sb faces the flat plate portion 26a of the upper casing 26 (i.e., the bottom surface of the housing space).

The width d2 of the gap G formed between the liquid crystal panel 10 and the lateral casing portion 26b is set to, for example, 0.1 mm to 0.3 mm. This gap width d2 may be determined according to the processing accuracy or assembly margin for the liquid crystal panel 10 and the upper casing 26. Note that the gap width d2 corresponds to the thickness of the resin layer 30 that covers the lateral end faces of the liquid crystal panel 10. The resin that is used for filling the gap G can be a transparent resin material. More specifically, as previously described in the section of Embodiment 1, for example, a cationically-polymerized resin can be used. The transparent resin material can be, for example, XET manufactured by Mitsui Chemicals, Inc.

To properly eject the resin into the gap G, the inside diameter of a nozzle 90 used in a dispenser device is preferably less than the gap width d2 that has been described above. The reason for that is that, if the inside diameter of the nozzle 90 is not less than the gap width d2, there is a probability that the ejected resin material flows out from a gap and cannot be beautifully applied.

The thickness 90t of the tip end of the nozzle (or needle) of a usual dispenser device is about 0.2 mm. Therefore, when a misalignment tolerance is estimated at 0.1 mm, the width 26t of the end face 26e of the upper casing (the width of a portion of the upper casing 26 near the edge, which is in the vicinity of the liquid crystal panel 10) is preferably set to at least not less than 0.3 mm from the corner. From the viewpoint of stable mass production, the width 26t is more preferably not less than 0.5 mm. Note that the dispenser nozzle used can be, for example, any of various nozzles available from ACE-GIKEN Co., Ltd.

In the present embodiment, an optical film layer 18 is attached to the rear surface 10Sa of the liquid crystal panel 10 as shown in FIG. 6 (note that in FIG. 7(b) a panel including the optical film layer 18 is illustrated as the liquid crystal panel 10). The housing space of the upper casing 26 is arranged relative to the liquid crystal panel 10 such that the rear surface 10Sa of the liquid crystal panel 10 (i.e., the outer surface of the optical film layer 18) and the end face 26e of the upper casing 26 are generally coplanar.

Note that, as shown in FIG. 7(b), the lateral casing portion 26b of the upper casing 26 still has a casing portion outside the end face 26e, and this casing portion also has an end face. In the present embodiment, the end face 26e of the lateral casing portion 26b refers to a surface which has an extent in the in-plane direction of the liquid crystal panel 10 and which is closest to the liquid crystal panel 10.

Here, as shown in FIG. 8(a), there is a level difference d1 (the distance in a direction normal to the panel) between the end face 26e of the lateral casing portion 26b and the surface of the liquid crystal panel 10 (or the surface of the panel structure including the liquid crystal panel). As the level difference d1 decreases, injection of the resin by the dispenser device can be more appropriately performed. Most preferably, there is substantially no level difference d1, so that one of the surfaces of the liquid crystal panel 10 and the end face 26e of the lateral casing portion are at generally the same level. Note that, in the present embodiment, the statement that these are positioned at the same level means that the level difference d1 is not more than 0.05 mm, and includes the case where a very small level difference is formed.

Accordingly, the needle 90 of the dispenser device is set at an appropriate height so as not to touch the liquid crystal panel 10 or the upper casing 26 as shown in FIG. 8(b). Thus, the resin can be injected into a desired position without interruption.

Here, to form the resin layer 30 so as to appropriately cover the lateral end faces of the liquid crystal panel 10, it is preferred that the level difference d1 is smaller than the above-described gap width d2 (i.e., d1<d2). As described above, the gap width d2 is commonly set to about 0.1 mm to 0.3 mm in consideration of the processing accuracy or assembly tolerance for the casing or the liquid crystal panel. Therefore, the level difference d1 is preferably less than 0.1 mm, and more preferably not more than 0.05 mm.

Setting the shape of the casing as described above enables the dispenser device to appropriately inject the resin material into the gap. The injected resin is preferably cured immediately after the injection by an optimum means which is selected depending on the type of the resin, such as heat or ultraviolet light. Such an arrangement enables to tightly seal the end faces of the liquid crystal panel 10 so that entry of impurities or water into the liquid crystal layer can be prevented.

Next, a form where the liquid crystal panel 10 is housed in the housing space of the upper casing 26 is described. FIG. 9(a) shows a form where the lateral end faces of the liquid crystal panel 10 and the display surface of the liquid crystal panel 10 are housed in and secured to the housing space of the upper casing 26 using a resin at one time. In this case, a resin layer 30a that covers the lateral end faces of the liquid crystal panel 10 and a resin layer 30b that covers the display surface of the liquid crystal panel 10 are formed in the same step of injecting and curing the resin.

Note that the resin layer 30a may be formed so as to cover only the lateral end faces of the liquid crystal panel 10 as shown in FIG. 9(b) by firstly securing the liquid crystal panel 10 to the flat plate portion of the upper casing 26 using a transparent double-sided tape 31, or the like, and thereafter injecting a resin into the gap between the lateral end faces of the liquid crystal panel 10 and the lateral casing portion 26.

Next, a liquid crystal display device 302 of a variation is described with reference to FIG. 10.

FIG. 10 is a cross-sectional view showing the configuration of the liquid crystal display device 302 of a variation. The difference of the liquid crystal display device 302 from the liquid crystal display device 300 shown in FIG. 6 resides in that a wall portion 26c is provided protruding from an end face 26e1 of the lateral casing portion 26b of the upper substrate 26 which defines the housing space for housing the liquid crystal panel 10. Further, to appropriately fit in with this wall portion 26c, the lower casing 28 also has a wall portion 28c.

In the liquid crystal display device 302, the liquid crystal panel 10 (including the optical films 18, 19) is housed inside the upper casing 26 via the resin layer 30 so as not to make a level difference from the end face 26e1 of the lateral casing portion 26b. The backlight 40 is attached using a double-sided tape, or the like, to the liquid crystal panel 10 that is held in the upper casing 26 via the resin layer 30.

At this point, as shown in FIG. 10(b), the end faces of the backlight 40 are surrounded by the wall portion 26c protruding from the end face 26e1, whereby the backlight is protected. Therefore, after the backlight 40 is attached to the liquid crystal panel 10, the probability of a mechanical shock to the backlight 40 can be reduced in a subsequent manufacturing step (for example, the step of coupling together the upper casing 26 and the lower casing 28), and troubles in the manufacturing process, such as falling off of the backlight 40 from the liquid crystal panel 10, can be prevented.

Note that, in order that the wall portion 26c of the upper casing 26 appropriately protects the backlight 40, it is preferred that the end face 26e2 of the wall portion 26c is provided at a still higher position than the surface of the backlight 40 attached to the liquid crystal panel 10.

Embodiment 4

FIGS. 11(a) and 11(b) show a form where the liquid crystal panel 10 is secured in the housing space of the lower casing 28. Note that, although not shown in FIG. 11(a), as a matter of course, the above-described backlight and circuit board may be provided between the liquid crystal panel 10 and the bottom surface of the lower casing 28.

In the present embodiment, a resin material is injected into the gap between the lateral end faces of the liquid crystal panel 10 and the inner lateral surfaces of the lateral casing portion 28b of the lower casing 28. The formed resin layer 30 serves to secure the liquid crystal panel 10 in the housing space of the lower casing 28.

In the step of injecting the resin into the gap between the liquid crystal panel 10 and the lower casing 28 to form the resin layer 30, a dispenser device 55 is used for pouring the resin material into the gap. In this step, a needle attached at the tip end of the dispenser device 55 is preferably moved just above the gap between the lower casing 28 and the liquid crystal panel 10. If the distance between the tip of the needle and the liquid crystal panel 10 or the lower casing 28 is large, a problem arises that the resin ejected from the needle is likely to interrupt. Thus, to inject the resin without interruption, the needle of the dispenser device 55 is preferably as close to the liquid crystal panel 10 or the lower casing 28 as possible.

In this step, as previously described in the section of Embodiment 3, a neighboring casing in which the resin is to be injected and the liquid crystal panel (or the panel structure) are made to have generally the same height, so that the resin layer 30 can be suitably formed.

Note that, when the liquid crystal panel 10 is a liquid crystal panel in a mode that does not require polarizers, such as the PDLC (Polymer Dispersed Liquid Crystal) mode, and does not have any other element such as a touch panel, it is preferred that the surface of the substrate that is a constituent of the liquid crystal panel 10 and the end face of the lateral casing portion are coplanar. When a polarizer is attached over the liquid crystal panel 10, it is preferred that the surface of the polarizer and the end face of the lateral casing portion are coplanar. When a touch panel is provided over a polarizer, it is preferred that the surface of the touch panel and the end face of the lateral casing portion are coplanar.

Note that the resin material that forms the resin layer 30 may be the same material as the seal material 16 (see FIG. 1) provided in the liquid crystal panel 10 (e.g., a Photolec S Series material manufactured by SEKISUI CHEMICAL CO., LTD.) or may be a curable resin (e.g., Loctite [manufactured by Henkel Japan], Photolec [manufactured by SEKISUI CHEMICAL CO., LTD.]), an epoxy thermosetting resin (manufactured by Mitsui Chemicals, Inc.), or a resin which has both of these properties. These materials can be used not only in Embodiment 4 but also in Embodiments 1 to 3 described above.

Figure 12:
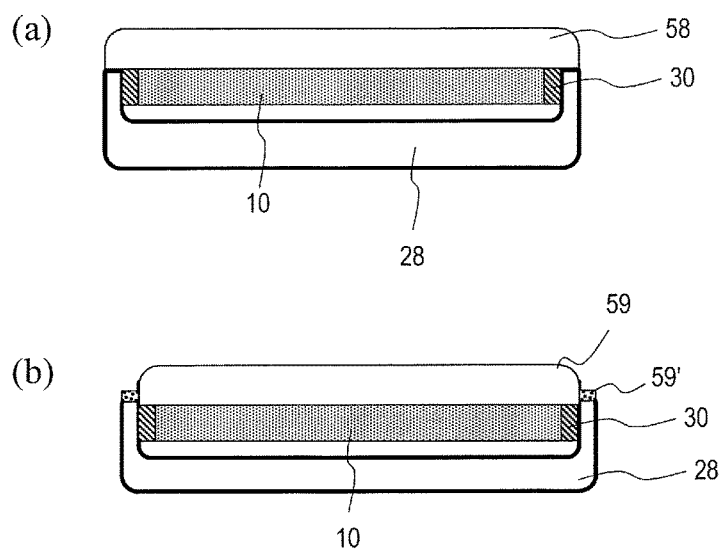
FIG. 12 Cross-sectional views showing liquid crystal display devices which have a transparent cover of Embodiment 4. (a) and (b) show different forms.

FIGS. 12(a) and 12(b) show forms where a light-transmissive cover 58, 59 is provided on a surface of the lower casing 28 in which the liquid crystal panel 10 is housed so as to cover the entire liquid crystal panel 10.

In the liquid crystal display device shown in FIG. 12(a), the light-transmissive cover 58 has a lens portion 58a which has a curved surface at least in its perimeter. The lens portion 58a enlarges an image from the peripheral display region of the liquid crystal panel 10, thereby displaying the image as if it is present above the frame region. Thus, a liquid crystal display device which appears to have no frame can be provided.

The light-transmissive cover 58 which has such a lens portion is described more specifically in WO 2010-089998 of the present applicant. The entire disclosure of WO 2010-089998 is incorporated by reference in this specification.

In the liquid crystal display device shown in FIG. 12(b), the lens portion of the light-transmissive cover 59 covers the mold portion formed by the resin layer 30. Further, a connecting portion 59' for connecting the lens portion and the lower casing 28 is provided near the end face of the lower casing 28. In this form, the display region of the liquid crystal panel 10 appears to extend as if it is present at the mold portion, and therefore, the frame is unlikely to be visually perceived. Since the region which is to enlarge light outgoing from the display region of the liquid crystal panel 10 is small as compared with the form shown in FIG. 12(a), the lens portion and the light-transmissive cover 59 can be made to have smaller thicknesses. Note that since the connecting portion 59' that connects the light-transmissive cover 59 and the lower casing 28 is provided at a position such that it is hidden behind the lens portion when viewed by a user, the frame is prevented from being conspicuous due to the connecting portion 59'.

Figure 13:
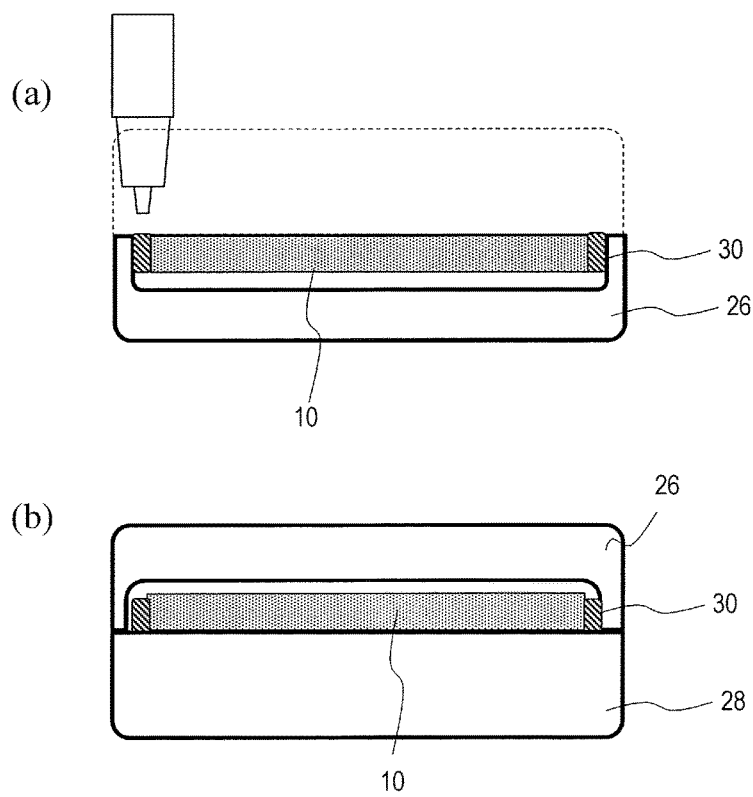
FIG. 13 Cross-sectional views showing other forms of Embodiment 4. (a) shows a state where a liquid crystal panel is secured to the upper casing. (b) shows a state where the upper casing is joined to the lower casing.

Although a form where the light-transmissive cover has a lens portion has been described above, another configuration may be employed. For example, as shown in FIGS. 13(a) and 13(b), a liquid crystal display device may be configured using a transparent upper casing 26 which has a lens portion that is similar to that of the light-transmissive cover 58 shown in FIG. 12(a) and which has an housing space in its inside. In this case, a liquid crystal display device whose frame is more unlikely to be visually perceived can be manufactured by securing the liquid crystal panel 10 in the housing space of the transparent upper casing 26 via the resin layer 30 as shown in FIG. 13(a) and thereafter combining the upper casing 26 with the lower casing 28 as shown in FIG. 13(*b*). Note that when the resin layer 30 is provided not only on the lateral end faces of the liquid crystal panel 10 but also on the front side, it is preferred that the resin layer 30 is formed by applying a transparent resin material in vacuum.

Embodiment 5

Figure 14:
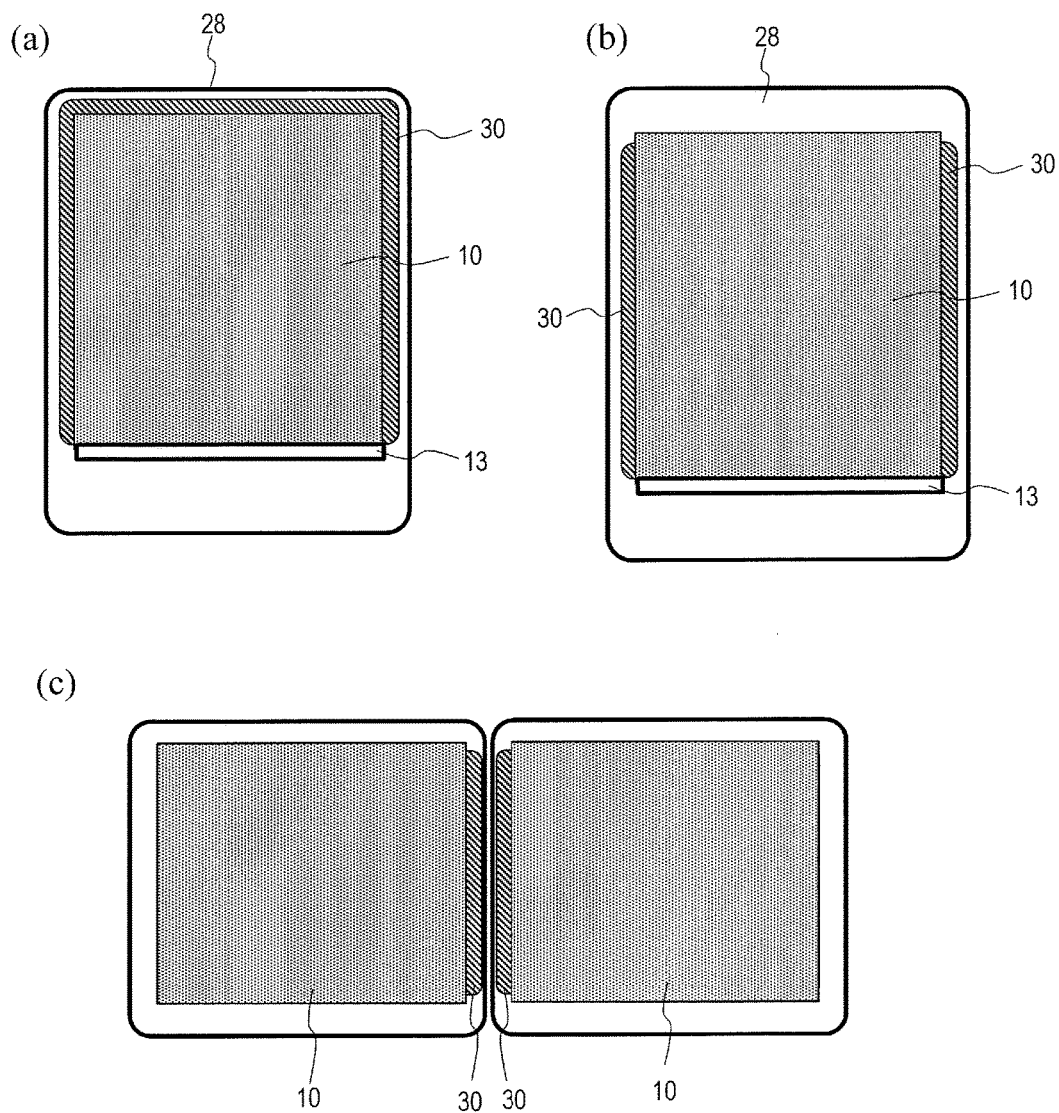
FIG. 14 Plan views for illustrating a liquid crystal display device of Embodiment 5. (a) shows a form where a resin layer is provided at three sides of a liquid crystal panel. (b) shows a form where a resin layer is provided at two sides of a liquid crystal panel. (c) shows a form where a resin layer is provided at one side of a liquid crystal panel.
Figure 15:
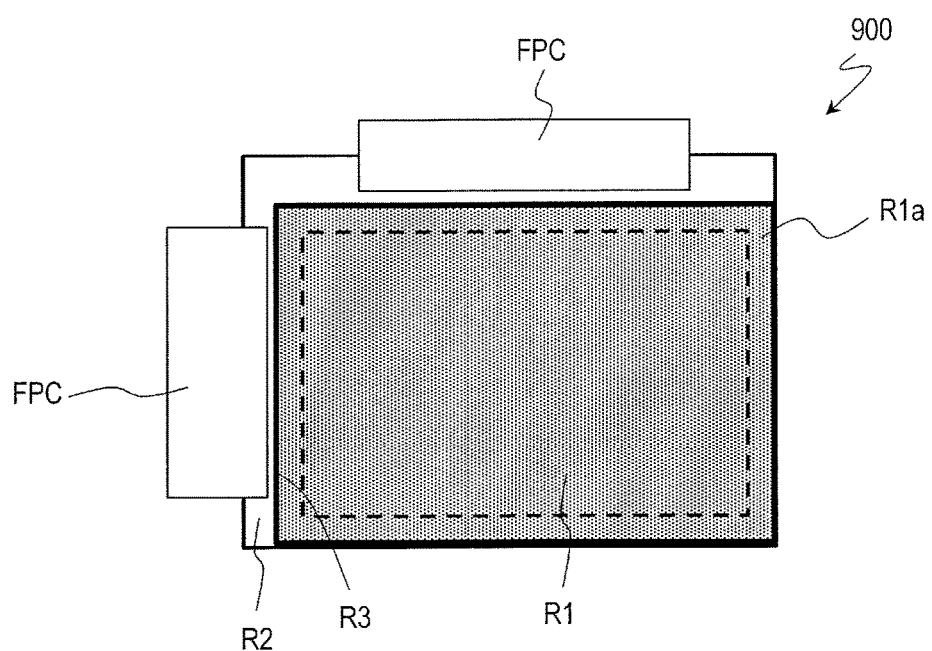
FIG. 15 A plan view for illustrating the display region and the frame region of a liquid crystal panel.

FIGS. 14(*a*) to 14(*c*) show a configuration where the resin layer 30 is not provided on at least one of the four sides of the liquid crystal panel 10.

The resin layer 30 does not necessarily need to be provided on all the four sides of the liquid crystal panel 10. For example, when a large frame region is provided on any side of the liquid crystal panel 10, the moisture proofness can be improved by increasing the width of the seal material, and therefore, it is not necessary to provide the resin layer 30. That is, the resin layer 30 need to be provided for protection only on one of the four sides of the liquid crystal panel 10 at which the frame need to be very narrow.

FIG. 14(*a*) shows a form where the resin layer 30 is provided on the three sides, the upper side, the left side and the right side, while the resin layer 30 is not provided on the lower side. In this form, a terminal portion is provided on the lower side, and the merit of narrowing the frame by narrowing the seal material 16 of the liquid crystal panel 10 is small. Thus, on the lower side that has the terminal portion, the seal material 16 has a sufficiently large width, and the frame is set to not less than about 2 mm, for example, while the resin layer 30 is formed on only the other three sides at which a narrow frame is realized.

FIG. 14(*b*) shows a form where the resin layer 30 is provided on the two sides, the left side and the right side, while the resin layer 30 is not provided on the upper side or the lower side. In the case of a cell phone, for example, the upper part of the liquid crystal panel 10 is provided with an earpiece, a camera, a light receiver, etc., while the lower part is provided with entry buttons and a mouthpiece. In this case, the necessity of narrowing the upper and lower sides of the liquid crystal panel 10 by narrowing the seal material is small. The effect achieved by narrowing the frame of the liquid crystal panel by narrowing the seal material is only less than about 1 mm even at the maximum.

In view of such, in this case, the frame of the liquid crystal panel 10 is narrowed only on the left and right sides, and the liquid crystal panel 10 is protected by the resin layer 30. On the upper and lower sides, the width of the seal material is sufficiently large, and the frame is set to not less than 2 mm, for example, whereby the reliability of the liquid crystal panel 10 is secured even though the resin layer 30 is not present.

FIG. 14(*c*) shows a case where two liquid crystal panels 10 are arranged side by side, and only frame regions provided between these panels are narrow frames. In a foldable eBook device or a multi-display configuration, there is an application where only one side of the liquid crystal panel has a narrow frame. In such a case, the resin layer 30 may be provided on only one side which is required to have a narrow frame.

Hereinabove, embodiments of the present invention have been described. A liquid crystal display device according to an embodiment of the present invention may be configured such that a pixel is driven by a TFT in which an oxide semiconductor layer is used as the active layer (oxide semiconductor TFT). The oxide semiconductor TFT is provided, for example, as a switching element in each pixel on the TFT substrate.

The oxide semiconductor layer includes, for example, an In—Ga—Zn—O based semiconductor (hereinafter, abbreviated as "In—Ga—Zn—O semiconductor"). Here, the In—Ga—Zn—O semiconductor is a ternary oxide of In (indium), Ga (gallium) and Zn (zinc). The proportion of In, Ga and Zn (mole fraction) is not particularly limited but includes, for example, In:Ga:Zn=2:2:1, In:Ga:Zn=1:1:1, In:Ga:Zn=1:1:2, and the like. In the present embodiment, the oxide semiconductor layer may be an In—Ga—Zn—O semiconductor layer which contains In, Ga and Zn in the proportion of In:Ga:Zn=1:1:1, for example.

A TFT which includes an In—Ga—Zn—O semiconductor layer has high mobility (more than 20 times that of a-Si TFT) and low current leakage (less than 1/100 of that of a-Si TFT) and is therefore suitably used as a driver TFT and a pixel TFT. Using a TFT which includes an In—Ga—Zn—O semiconductor layer enables a great reduction of the power consumption by the display device.

The In—Ga—Zn—O semiconductor may be amorphous or may include a crystalline portion so that it can have crystallinity. A preferred crystalline In—Ga—Zn—O semiconductor is a crystalline In—Ga—Zn—O semiconductor whose c-axis is oriented generally perpendicular to the layer surface. An example of the crystalline structure of such an In—Ga—Zn—O semiconductor is disclosed in Japanese Laid-Open Patent Publication No. 2012-134475. The entire disclosure of Japanese Laid-Open Patent Publication No. 2012-134475 is incorporated by reference in this specification.

The oxide semiconductor layer may include any other oxide semiconductor instead of the In—Ga—Zn—O semiconductor. For example, the oxide semiconductor layer may include a Zn—O based semiconductor (ZnO), an In—Zn—O based semiconductor (IZO (registered trademark)), a Zn—Ti—O based semiconductor (ZTO), a Cd—Ge—O based semiconductor, a Cd—Pb—O based semiconductor, CdO (cadmium oxide), a Mg—Zn—O based semiconductor, an In—Sn—Zn—O based semiconductor (e.g., $In_2O_3$—$SnO_2$—ZnO), an In—Ga—Sn—O based semiconductor, or the like.

This specification discloses liquid crystal display devices of the following items.

[Item 1] A liquid crystal display device, including: a casing including a lateral casing portion which has an inner lateral surface and a housing space surrounded by the inner lateral surface; a panel structure including a liquid crystal panel, the liquid crystal panel including a pair of substrates, a liquid crystal layer held between the pair of substrates, and a seal material arranged so as to enclose the liquid crystal layer, the panel structure being housed in the housing space; and a resin layer filling at least part of a gap formed between the inner lateral surface of the lateral casing portion and a lateral end face of the liquid crystal panel, the resin layer securing the liquid crystal panel to the inner surface, wherein in an in-plane direction of the liquid crystal panel, the seal material of the liquid crystal panel is covered with the resin layer and the lateral casing portion.

According to the liquid crystal display device of Item 1, even if it is a narrow-frame liquid crystal display device, entry of water vapor or impurities from the outer environment into the liquid crystal layer is suitably prevented, and thus, occurrence of display failures in a peripheral display region can be prevented.

[Item 2] The liquid crystal display device of Item 1, wherein the resin layer covers an entire lateral end face of the liquid crystal panel, the entire lateral end face of the liquid crystal panel including a lateral end face of the pair of substrates.

According to the liquid crystal display device of Item 2, entry of water vapor or the like into the liquid crystal layer can be effectively prevented.

[Item 3] The liquid crystal display device of Item or 2, wherein the lateral casing portion has an end face continuing to the inner lateral surface, the end face being generally perpendicular to the inner lateral surface, the panel structure and the liquid crystal panel each has a first surface which is closer to the end face of the lateral casing portion and a second surface which is opposite to the first surface, and a level difference d1 in a direction normal to the liquid crystal panel between the end face of the lateral casing portion and the first surface of the panel structure or the liquid crystal panel is not less than 0 mm and not more than 0.1 mm.

According to the liquid crystal display device of Item 3, the gap between the liquid crystal panel and the casing can be appropriately filled with the resin, and a desirable resin layer can be formed. Therefore, entry of water vapor or the like into the liquid crystal layer can be effectively prevented.

[Item 4] The liquid crystal display device of Item 3, wherein the level difference d1 is smaller than a width d2 of a gap between the inner lateral surface and the lateral end face of the liquid crystal panel.

According to the liquid crystal display device of Item 4, a desirable resin layer can be formed. Therefore, entry of water vapor or the like into the liquid crystal layer can be effectively prevented.

[Item 5] The liquid crystal display device of Item 3 or 4, wherein the width d2 of the gap is not less than 0.1 mm and not more than 0.3 mm.

According to the liquid crystal display device of Item 5, a desirable resin layer can be formed even when the gap is narrow. Therefore, entry of water vapor or the like into the liquid crystal layer can be effectively prevented.

[Item 6] The liquid crystal display device of any of Items 1 to 5, wherein the resin layer is made of a cationically-polymerized epoxy resin material.

According to the liquid crystal display device of Item 6, a desirable resin layer can be formed. Therefore, entry of water vapor or the like into the liquid crystal layer can be effectively prevented.

[Item 7] The liquid crystal display device of Item 6, wherein the seal material is a material which is different from the resin layer.

According to the liquid crystal display device of Item 7, a desirable resin layer can be formed. Therefore, entry of water vapor or the like into the liquid crystal layer can be effectively prevented.

[Item 8] The liquid crystal display device of Item 7, wherein a width of the seal material is not more than 1.0 mm.

According to the liquid crystal display device of Item 8, in a narrow-frame liquid crystal display device, entry of water vapor or the like into the liquid crystal layer can be effectively prevented.

[Item 9] The liquid crystal display device of any of Items 1 to 8, further including a light-transmissive cover including a lens portion at a position corresponding to a perimeter portion of the panel structure, the light-transmissive cover being arranged so as to cover the panel structure.

According to the liquid crystal display device of Item 9, the frame region is more unlikely to be visually perceived.

[Item 10] The liquid crystal display device of any of Items 1 to 9, wherein the panel structure has a planar rectangular shape which has four sides, the inner lateral surface of the lateral casing portion is arranged so as to surround the four sides, and the resin layer is provided only in portions corresponding to three, two, or one of the four sides.

According to the liquid crystal display device of Item 10, a configuration is enabled where the resin layer is provided only in a side which is required to have a narrow frame.

[Item 11] The liquid crystal display device of any of Items 1 to 10, wherein the casing includes a flat plate portion which is connected to the lateral casing portion and which forms a bottom surface of the housing space, and a resin layer which is made of the same material as the resin layer is also provided in a gap between the panel structure and the flat plate portion.

According to the liquid crystal display device of Item 11, the panel structure can be more surely secured to the casing by the resin layer.

[Item 12] The liquid crystal display device of any of Items 1 to 11, further including another casing, the another casing including a lateral casing portion which has an inner lateral surface and a housing space surrounded by the inner lateral surface, wherein a backlight is held in the housing space of the another casing, the casing and the another casing are joined together such that end faces of their lateral casing portions are joined together, and the liquid crystal panel and the backlight are stacked up.

According to the liquid crystal display device of Item 12, the liquid crystal panel and the backlight, which are stacked up, are housed in a housing space formed by combining two casing portions.

INDUSTRIAL APPLICABILITY

Embodiments of the present invention are widely used as various liquid crystal display devices including a liquid crystal panel.

REFERENCE SIGNS LIST 10 liquid crystal panel
11 TFT substrate
12 counter substrate
14 liquid crystal layer
16 seal material
18, 19 optical film layer
20 lateral casing portion
26 upper casing
26a flat plate portion
26b lateral casing portion
26e end face of lateral casing portion
28 lower casing
30 resin layer
40 backlight
50 touch panel
58, 59 light-transmissive cover with lens portion
60 circuit board
100 liquid crystal display device
R1 display region
R1a peripheral display region
R2 frame region
R3 seal region

The invention claimed is:

1. A liquid crystal display device, comprising:
 a casing including a lateral casing portion which has an inner lateral surface and a housing space surrounded by the inner lateral surface;
 a panel structure including a liquid crystal panel, the liquid crystal panel including a pair of substrates, a liquid crystal layer held between the pair of substrates, and a seal material arranged so as to enclose the liquid crystal layer, the panel structure being housed in the housing space; and
 a resin layer filling at least part of a gap formed between the inner lateral surface of the lateral casing portion and a lateral end face of the liquid crystal panel, the resin layer securing the liquid crystal panel to the inner lateral surface,
 wherein in an in-plane direction of the liquid crystal panel, the seal material of the liquid crystal panel is covered with the resin layer and the lateral casing portion,
 wherein the panel structure has a planar rectangular shape which has four sides,
 the inner lateral surface of the lateral casing portion is arranged so as to surround the four sides, and
 the resin layer is provided only in portions corresponding to two or one of the four sides.

2. The liquid crystal display device of claim 1, wherein the resin layer covers an entire lateral end face of the liquid crystal panel, the entire lateral end face of the liquid crystal panel including a lateral end face of the pair of substrates.

3. The liquid crystal display device of claim 1, wherein
 the lateral casing portion has an end face continuing to the inner lateral surface, the end face being generally perpendicular to the inner lateral surface,
 the panel structure and the liquid crystal panel each has a first surface which is closer to the end face of the lateral casing portion and a second surface which is opposite to the first surface, and
 a level difference d1 in a direction normal to the liquid crystal panel between the end face of the lateral casing portion and the first surface of the panel structure or the liquid crystal panel is not less than 0 mm and not more than 0.1 mm.

4. The liquid crystal display device of claim 3, wherein the level difference d1 is smaller than a width d2 of a gap between the inner lateral surface and the lateral end face of the liquid crystal panel.

5. The liquid crystal display device of claim 4, wherein the width d2 of the gap is not less than 0.1 mm and not more than 0.3 mm.

6. The liquid crystal display device of claim 1, wherein the resin layer is made of a cationically-polymerized resin material.

7. The liquid crystal display device of claim 6, wherein the seal material is a material which is different from the resin layer.

8. The liquid crystal display device of claim 7, wherein a width of the seal material is not more than 1.0 mm.

9. The liquid crystal display device of claim 1, further comprising a light-transmissive cover including a lens portion at a position corresponding to a perimeter portion of the panel structure, the light-transmissive cover being arranged so as to cover the panel structure.

10. The liquid crystal display device of claim 1, wherein
 the casing includes a flat plate portion which is connected to the lateral casing portion and which forms a bottom surface of the housing space, and
 a resin layer which is made of the same material as the resin layer is also provided in a gap between the panel structure and the flat plate portion.

11. The liquid crystal display device of claim 1, further comprising another casing, the another casing including a lateral casing portion which has an inner lateral surface and a housing space surrounded by the inner lateral surface,
 wherein a backlight is held in the housing space of the another casing,
 the casing and the another casing are joined together such that end faces of their lateral casing portions are joined together, and
 the liquid crystal panel and the backlight are stacked up.

* * * * *